(No Model.) 2 Sheets—Sheet 1.

J. LAUDE.
SEED PLANTER AND FERTILIZER DISTRIBUTER.

No. 474,256. Patented May 3, 1892.

WITNESSES:
Paul Johst
C. Sedgwick

INVENTOR:
J. Laude
BY Munn & Co.
ATTORNEYS.

THE NORRIS PETERS CO., PHOTO-LITHO., WASHINGTON, D. C.

(No Model.) 2 Sheets—Sheet 2.
J. LAUDE.
SEED PLANTER AND FERTILIZER DISTRIBUTER.
No. 474,256. Patented May 3, 1892.
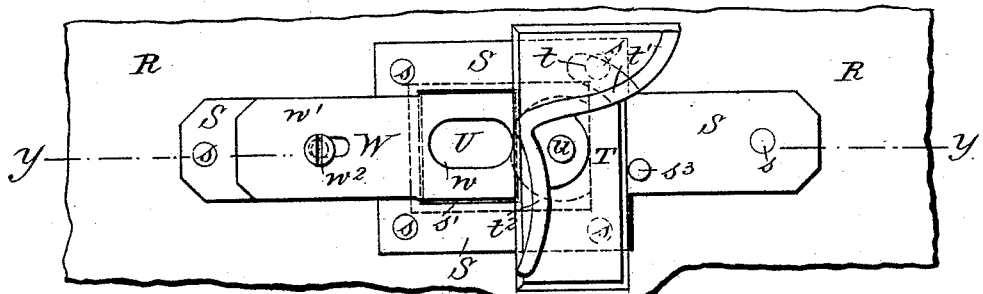
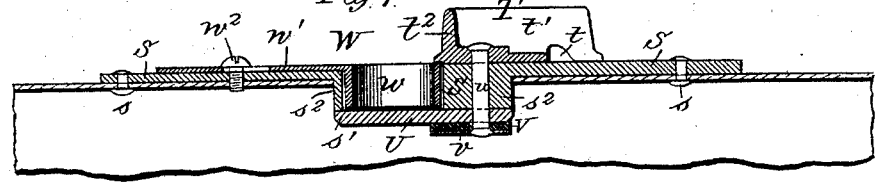
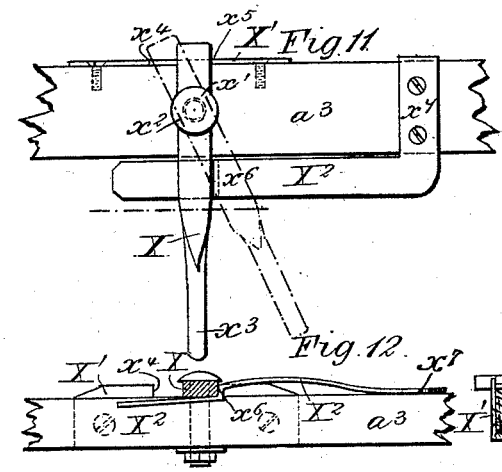
WITNESSES
Paul Johal
C. Sedgwick
INVENTOR:
J. Laude
BY
Munn & Co
ATTORNEYS.

UNITED STATES PATENT OFFICE.

JOSEPH LAUDE, OF MONTICELLO, ARKANSAS.

SEED-PLANTER AND FERTILIZER-DISTRIBUTER.

SPECIFICATION forming part of Letters Patent No. 474,256, dated May 3, 1892.

Application filed May 13, 1890. Serial No. 351,691. (No model.)

*To all whom it may concern:*

Be it known that I, JOSEPH LAUDE, of Monticello, in the county of Drew and State of Arkansas, have invented a new and Improved Seed-Planter and Fertilizer-Distributer, of which the following is a full, clear, and exact description.

My invention relates to a seed-planter and fertilizer-distributer, and has for its object to improve the construction of a machine of this class for which Letters Patent No. 325,844 were issued to me September 8, 1885.

The present improvements relate more particularly to the hopper and its connections or attachments and to the seed-dropping devices of the drum, and have been made with a view to provide a machine which has a wider range of work and is comparatively less expensive to build and is more satisfactory in use.

The invention consists in certain novel features of construction and combinations of parts of the seed-planter and fertilizer-distributer, all as hereinafter described and claimed.

Reference is to be had to the accompanying drawings, forming a part of this specification, in which similar letters of reference indicate corresponding parts in all the figures.

Figure 1:
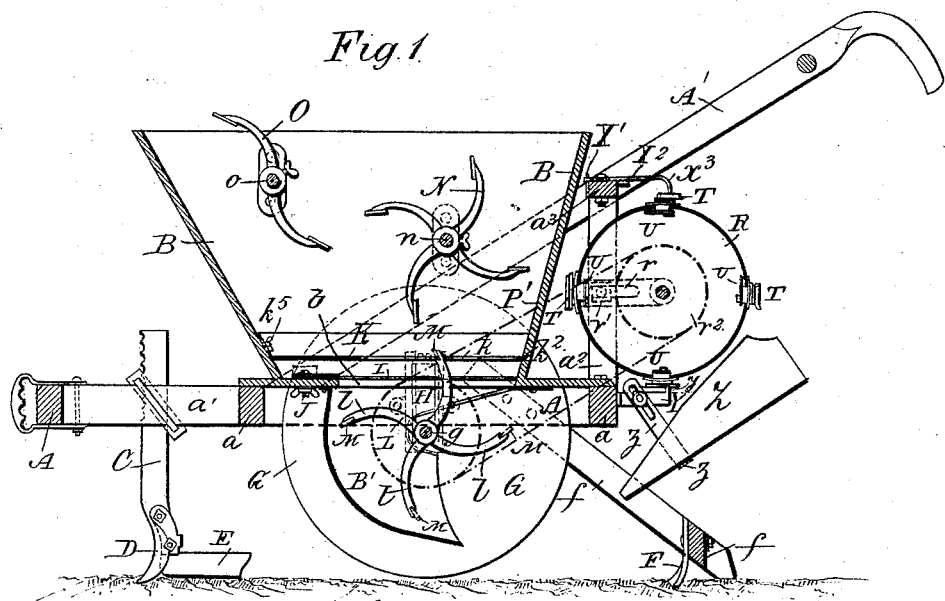
Figure 2:
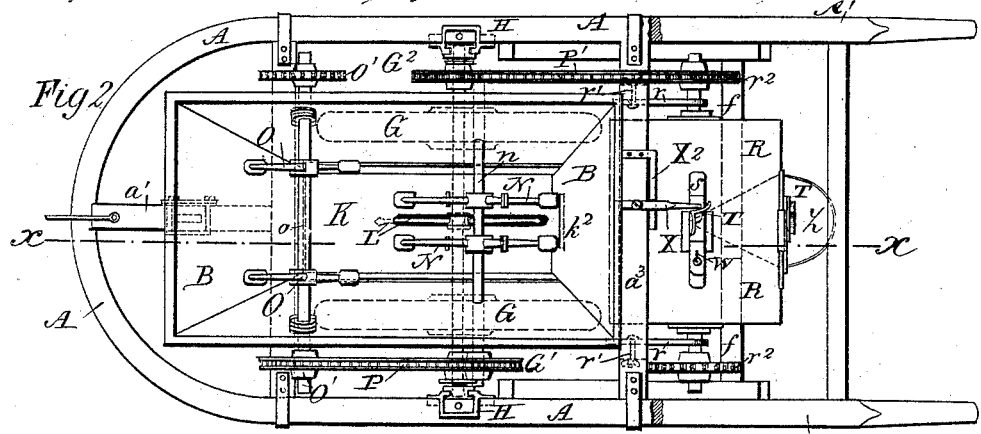
Figures 3, 5:
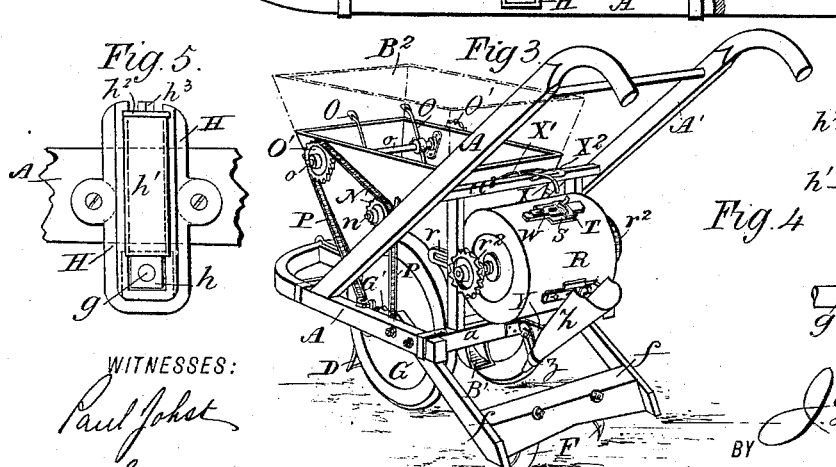
Figure 4:
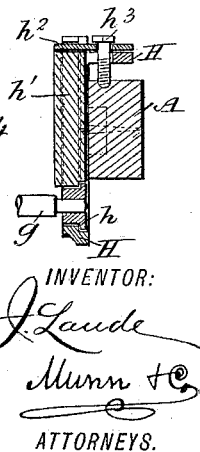

Figure 1 is a central vertical longitudinal section of the machine, taken on the line $x\ x$ in Fig. 2. Fig. 2 is a plan view of the machine. Fig. 3 is a rear perspective view thereof. Fig. 4 is a detail vertical transverse section of one of the axle-bearings. Fig. 5 is a side view of said axle-bearing. Fig. 6 is an enlarged plan or side view of part of the wall of the drum and one of its seed-dropping devices. Fig. 7 is a longitudinal section taken on the line $y\ y$ in Fig. 6. Figs. 8, 9, and 10 are enlarged detail views of parts of the wheel which feeds fertilizer or seed from the front hopper of the machine. Figs. 11, 12, and 13 are enlarged detail views of the adjustable trip-arm controlling feed of seed or fertilizer from the rear drum of the machine. Fig. 14 is a plan view of the main bottom of the hopper and the feed-gages thereat. Fig. 15 is a side elevation of the lower portion of the hopper and its gages. Fig. 16 is a plan view of the removable bottom of the hopper, used when planting cotton-seed or distributing fine fertilizers. Fig. 17 is an outside perspective view of one of the seed-gages of the drum. Fig. 18 is a vertical sectional view showing a modified form of bearing for the axle, and Fig. 19 is a bottom perspective view of this bearing.

The machine-frame A is made with a bowed front and side bars formed, preferably, in one piece and with suitable cross-bars $a\ a$, on which the hopper B is supported. A longitudinal part $a'$ of the frame sustains the clipped standard C, which carries a furrow-opening plow D and a drag E, which smooths the furrow before the fertilizer or seed is dropped into it, and after the seed is dropped it is covered by plows F, fixed to a frame $f$, bolted to the main frame.

The machine travels on two wheels G G, which are fixed to an axle $g$, which is journaled at each end in a movable bearing $h$, held in the vertical slot of a box H, which is bolted through side lugs on it to the frame. A metal block $h'$ is slipped into guideways in the box H above the bearing $h$, and a cap-plate $h^2$ is then passed laterally through slots at the top of the box, so as to overlie the block $h'$ and a top lug on the box, and a set-screw $h^3$ is then passed through a hole in the cap-plate into the frame A, as most clearly shown in Figs. 4 and 5 of the drawings. By using blocks $h'$ of different heights in the boxes H the frame may be raised or lowered on the axle, as occasion may require. Axle bearings and boxes, substantially like those H $h\ h'\ h^2 h^3$, are shown in my aforesaid prior patent, No. 325,844, but for supporting a star-shaped seed-dropping wheel which runs on the ground and not for sustaining a main frame and superposed hopper on wheels, as in this machine. It may be desirable at times to use a fixed axle bearing or box H', (shown in Figs. 18 and 19 of the drawings,) held to the frame A by one bolt H². This axle-box H' has an inner part $h^4$, having a hole $h^5$ for the axle, and also has a flange $h^6$, which lies against the frame and has pins or tenons $h^7\ h^7$ entering the frame to steady the box thereon.

The main frame A, the opener D, the drag E, and the coverers are made substantially like those shown in my prior patent, except that the coverers of this machine are not made to yield against resisting-springs, as in the former construction.

The hopper B has the usual downwardlytapering form, and at its bottom is provided with an opening $b$, through which fertilizers or seeds may drop to the ground.

Figs. 14 and 15 of the drawings more clearly show a pair of gage-plates I I, which are pivoted at $i$ $i$ to the bottom of the hopper and at their opposite ends are provided with curved slots $j$ $j$, one in each plate, and through which a thumb or set screw J is passed into the hopper-bottom. The forward ends of the gages I I are extended laterally to opposite sides of the hopper, through slots of which they are passed, and are then turned up to provide flanges $i'$ $i'$, forming handles by which the gages may be moved laterally toward or from each other to contract or enlarge the hopper-opening $b$ to regulate the dropping of coarser fertilizers (such as stable-manure and the like) from the hopper.

I have also provided a removable bottom K for the hopper, which will be placed therein when finer fertilizers—such as guano or bone-dust—are to be distributed or when cotton-seed is to be planted directly from the hopper. This bottom K, which is shown detached in Fig. 16 of the drawings, consists of a main plate $k$, having a slot $k'$, through which fertilizer or seed may fall. At its rear end the plate has a tenon or tongue $k^2$, and at its front end and opposite sides the bottom K has three upbent flanges $k^3$ $k^3$ $k^3$, which fit closely against and thus make a tight joint with the correspondingly-inclined walls of the hopper when the tongue $k^2$ is entered into a slot made in the hopper to receive it, and the bottom is then dropped in its normal position, which is about three inches, more or less, above the main hopper bottom on which the gages I rest, and as shown in Fig. 1 of the drawings. The front flange $k^3$ is provided with a slot $k^4$, through which a thumb-screw $k^5$ is passed into the front wall of the hopper to secure the bottom K in place and at the same time allow it to be raised or lowered a little relatively to the extremities of the arms of a lower feed-wheel L, which rotates with the axle G of the machine to regulate the quantity of seed delivered by the wheel. This feed-wheel L has a series (preferably four) of radiating arms $l$, preferably curved, and each arm carries at its extremity a detachable steel blade M. The hub of the wheel has a V-shaped transverse groove, which fits a corresponding rib $g'$ on the axle, and a thumb-screw $g^2$ in the feed-wheel hub holds the wheel to the axle $g$ in correct lateral adjustment relatively to the openings $b$ $k'$, through which seed or fertilizer fall from the hopper. The axle rib $g'$ extends its whole length and serves also as a spline or feather to compel the main wheels to turn with the axle.

At its extremity each arm $l$ of the feed-wheel is provided with a V-shaped shoulder $l'$, which is undercut, so that the correspondingly-shaped inner notched end $m$ of the blade M will be overlocked by the arm-shoulder $l'$, and when a screw $m'$ is passed through the blade into a threaded hole $m^2$ in the arm the blade will be most securely held to the arm, which will be the adjustment when the removable bottom K is not applied in the hopper; but when this bottom is used the blades M will be detached from the feed-wheel arms $l$ to allow their somewhat narrower angular extremities $l^2$ to work through the slot $k$ of said bottom.

A spout B', held to the bottom of the hopper B, receives the seed or fertilizer drawn from the hopper by the feed-wheel L and delivers it to the furrow.

Above the feed-wheel L is journaled in the hopper B a transverse shaft $n$, onto which are fixed two cast-iron agitator-wheels N N, and in front of and above the level of the shaft $n$ is journaled in the hopper another shaft $o$, onto which are fixed two cast-iron agitator-wheels O O, which are more widely separated laterally than the two wheels N N. (See Figs. 1 and 2 of the drawings.) The wheel-agitators N are each preferably provided with four arms having fixed broadened extremities corresponding in marginal form with the blades M of the feed-wheel L; but the wheel-agitators O preferably have but two arms each. The agitators are fastened by set-screws, allowing any required or preferred lateral adjustment of them on their shafts within the hopper. The shafts $g$ $n$ $o$ are provided, respectively, with gear or chain wheels G' N' O', onto which a driving-chain P may be placed to rotate the feed-wheel L and both agitator-wheels in the same direction as the machine travels forward on the wheels G, and whereby the fertilizer or seed in the hopper will be forced downward to the feed-wheel, which carries it from the hopper.

Horizontally-slotted plates $r$ $r$, held by screws $r'$ $r'$, passed through the slots into uprights $a^2$ of the frame A, afford bearings for the axle of a seed or fertilizer drum R, which is rotated by a driving-chain P', passing from a chain-wheel $G^2$ on the axle $g$ to a chain-wheel $r^2$ on the drum-shaft. By loosening the screws $r'$ $r'$ the drum may be shifted bodily forward or backward to accommodate different-sized driving-chain wheels $G^2$ or $r^2$ to cause the drum to rotate faster or slower for planting hills of seed or dropping fertilizer from it at different distances apart. Chain-wheels $r^2$ of different sizes may be applied at both ends of the drum-shaft to allow the drum to be rotated at different speeds by chains running to either wheel G' $G^2$ of the main axle $g$ of the machine.

The drum is provided with a series, preferably four, of seed-dropping openings fitted with seed-pockets and dropping gates or valves of peculiar construction, next described, and which are an improvement on the seed gates or valves shown in my prior patent, No. 325,844.

I now make each seed-discharge device of but three main cast-metal pieces, besides the seed gage or pocket, or but four cast-metal pieces in all—that is to say, a main plate S, which is fixed by rivets $s$, preferably six in all, to the side wall of the drum R, and two valves, an outer one T and an inner one U, held to turn together on a suitable pin $u$, which is journaled in the main plate S. A rubber washer V is interposed between a metal washer $v$ and the valve U and constantly presses or holds both valves T U to their seats at opposite sides of the plate S, which has an opening $s'$, surrounded by an inwardly-extending flange $s^2$ of the plate. That end portion of the plate S to which the valve T is pivoted is made as much higher than the opposite end of the plate to allow the valve T to swing clear over but close to the top of the seed-gage W, which has a hole or pocket $w$ of proper size to suit the seed being sown. The gage is provided in its stem-portion $w'$ with a hole, through which a screw $w^2$ is passed into the plate S for holding the gage in place. A stud or pin $s^3$ on the plate S forms a stop to the movement in both directions of the valves T U, which are arranged relatively at right angles, so that when the valve T is swung around to uncover the seed-gage pocket $w$, as shown in Figs. 6 and 7 of the drawings, the valve U will be fairly across the pocket and the valve T will be stopped by the stud $s^3$; but when the valves are swung one-quarter around to cause the valve T to cover the pockets $w$ the valve U will then be swung around open or clear of the pocket and the valve U will be stopped by contact of the stud $s^3$ with the inner end of a curved slot $t$, made in the under side of the valve. It will thus appear that relatively with the seed-pocket $w$ of the gage W the valve T is open while the valve U is closed, and vice versa. The seed-gages W are interchangeable in the plate S to allow gages having any required size of seed-pocket $w$ to be applied to the drum, or to allow one, two, or three of the four gages to be solid or devoid of a seed-pocket to cause the other gage or gages to drop seed at shorter or longer distances apart.

The outside seed-dropping valve T is provided with two projecting flanges $t'$ $t^2$, which range nearly at right angles to each other and are preferably curved a little at their outer faces, which when the hopper revolves strike trip-arms X Y on the machine-frame for automatically dropping the hills of seed. The trip-arm X is provided with a hole $x'$, through which a screw or bolt $x^2$ passes into an upper cross-bar $a^3$ on the rear uprights $a^2$ of the frame. This screw $x^2$ thus holds the arm X, so that its down-bent end $x^3$ is adapted to lie in the path of the flange $t'$ of the valve T; but the trip-arm may be swung to one side on its screw $x^2$ and until its front end strikes a shoulder $x^4$ of a plate X', which is fixed to the front side of the cross-bar $a^3$, and when the trip-arm is in this position (indicated by the dotted lines in Fig. 11 of the drawings) the end $x^3$ will then be out of the path of the valves T of the seed-drum. When the trip-arm is swung to the position shown in full lines, the arm will strike the other shoulder $x^5$ of the plate X' and will also stop at a shoulder $x^6$ of a spring $X^2$, which is fastened at its end $x^7$ to the cross-bar $a^3$, and by its free end normally underlies the trip-arm. This stop-shoulder $x^6$ is preferably formed by bending the spring $X^2$. When the trip-arm X is to be swung out of the path of the drum-valves T, the spring $X^2$ must first be depressed to allow the arm to pass by its shoulder $x^6$. The trip-arm Y is a simple bar or plate, which is fixed to the lower rear cross-bar $a$ of the main frame and has an upwardly-projecting extremity $y$, which lies in the path of the flange $t^2$ of the valve T to open this valve and allow escape of seed from the gage-pocket $w$ into a chute Z, which is sustained by a suitable strap or band $z$ from the frame or the trip-arm Y, and conducts the seed downward into the furrow.

The operation of the machine is as follows: When it is desired to plant corn and distribute a coarse fertilizer at the same time, the fertilizer will be placed in the hopper B, from which the auxiliary bottom K is removed, and the corn will be placed in the drum R, whose gages W will be adjusted to drop the proper quantity for each hill. As the machine is drawn over the field, the attendant will steady it by its handles A', and the agitators N O will stir the manure and carry it downward to the feed-wheel L, which now has the blades M on it, and these blades by working between the properly-adjusted bottom gages I I of the hopper will carry the manure down into the chute B', whence it falls into the furrow opened by the plow D. Simultaneously with this operation the drum R will be rotated, and as its valves T in turn strike the trip-arm X the gage-pockets $w$ will be closed by them, while the inner valves U are opened. Hence as the drum turns over forward the successive pockets $w$ will fill with seed, and when each valve T strikes the trip arm or plate Y the valve U will close and the valve T will open to drop the pocket full of seed into the chute Z, which delivers it in a hill into the furrow, wherein it will be covered by the plows F. In this adjustment of the machine a coarse manure may be dropped from the hopper B, while a fine fertilizer may be dropped on top of it from the drum R.

When distributing coarse manure, I will place an auxiliary top section $B^2$ onto the hopper B to increase its capacity. This top is shown on the hopper in dotted lines in Fig. 3 of the drawings.

For planting cotton-seed the bottom K will be adjusted to the hopper and the plates M will be removed from the feed-wheel L to allow the ends of the feed-wheel arms $l$ to work through the narrow slot $k'$ of the bottom K, and cotton-seed will be placed in the hopper B, while a suitable fine fertilizer will be placed in the drum R, and as the machine moves forward the feed-wheel L will pull the cotton-seed stirred up by the agitators N O from the hopper and drop it to the furrow, while the fertilizer will be dropped from the gages W by the operation of the valves T U by the trip-arms X Y. In this adjustment of the machine it may be used to drop a fine fertilizer from the hopper B, while any kind of smooth hard seeds may be simultaneously dropped from the drum R. By adjusting the driving-chains, gear-wheels, and seed-delivery devices the drum R may be caused to drop any required quantity of seed for a hill, and the hills of seed may be dropped any required distances apart, say one foot, eighteen inches, two feet, three feet, four feet, and six feet, as the nature of the seed or the conditions of growth may require.

Having thus described my invention, what I claim, as new and desire to secure by Letters Patent, is—

1. In a seed-planter and fertilizer-distributer, the combination, with the main frame and the hopper fixed thereon, of a feed-wheel, which works through the slotted bottom of said hopper, an axle on which the feed-wheel is keyed, transporting-wheels mounted on said axle, and means for adjusting the frame and hopper vertically relatively to said feed-wheel and axle, as shown and described.

2. In a seed-planter and fertilizer-distributer, the combination, with the hopper, of a pair of laterally-adjustable gage-plates pivoted at one end to the hopper beneath its outlet and having their overlapping free ends provided with coincident slots and also with lateral projections, which serve as handles, and a fastening-screw passed through said slots into the hopper, substantially as herein set forth.

3. In a seed-planter and fertilizer-distributer, the combination, with the frame, axle, wheels, and hopper, of an upper removable auxiliary slotted bottom fitted in the hopper above its slotted bottom, and a feed-wheel on the axle having arms provided with detachable blades, substantially as described, whereby when the auxiliary bottom is detached the feed-wheel blades may be applied to work coarse fertilizer from the main hopper-outlet, and when the feed-wheel blades are detached and the auxiliary bottom is applied to the hopper the feed-wheel arms will work fine fertilizer or seeds through the slot of the auxiliary bottom, as herein set forth.

4. In a seed-planter and fertilizer-distributer, the combination, with the hopper, of an auxiliary detachable bottom provided with a discharge-slot and having a tongue or tenon at one end and three flanges, one at the other end and one at each side and adapted to the hopper-walls, substantially as herein set forth.

5. In a seed-planter and fertilizer-distributer, the combination, with the hopper, of an auxiliary detachable slotted bottom provided with a tongue or tenon at one end and having three flanges, one at the other end and one at each side, said flanges being disconnected from each other to adapt them to fit the hopper-walls, substantially as herein set forth.

6. In a seed-planter and fertilizer-distributer, the combination, with the hopper, of an auxiliary detachable bottom K, having a bottom plate $k$, slotted at $k'$, a tenon $k^2$, and marginal flanges $k^3$ $k^3$ $k^3$, a vertical slot $k^4$, and a fastening screw or device passed through the slot $k^4$ into the hopper, substantially as described, for the purposes set forth.

7. In a seed-planter, the seed-drum made with a discharge-opening, a plate held to the drum and having a coincident opening adapted to receive a seed gage or pocket, two right-angularly-disposed valves held to a pin journaled in the main plate, the outer valve having projections adapted to tappets for operating both valves, and an elastic medium held next one valve and drawing both valves to their seats, substantially as herein set forth.

8. In a seed-planter, the seed-drum made with a discharge-opening, a main plate held to the drum and having a coincident opening, said plate at one side of its opening made higher or more prominent than at the other side thereof, two right-angularly-disposed valves fitted one at each face of the plate and held to a pin journaled in the plate, a seed-gage having a body portion or pocket fitted to the plate-opening and having a stem extending over the lower portion of the main plate to allow the outer valve to work over the gage, and a fastening device for the gage, substantially as herein set forth.

9. In a seed-planter, the combination, with the frame, the seed-drum, and the seed-dropping valves thereon provided with projections or flanges, of a tappet-arm held to the frame and a spring having a shoulder, against which the tappet normally rests to hold it for operating the seed-dropping valves and allowing the tappet to be swung out of the path of the valves, substantially as herein set forth.

10. In a seed-planter, the combination, with the frame, the seed-drum, and seed-dropping valves on the drum, of a tappet-arm X on the frame and a spring $X^2$ on the frame and having a shoulder $x^6$, forming a stop to the tappet-arm, substantially as herein set forth.

11. In a seed-planter, the combination, with the frame, the seed-drum, and seed-dropping valves on the drum, of a tappet-arm X on the frame, a spring $X^2$ on the frame and having a shoulder $x^6$, forming a stop to the tappet, and a plate $X'$ on the frame having a shoulder or shoulders limiting the swinging movement of the tappet, substantially as herein set forth.

JOSEPH LAUDE.

Witnesses:
SIG. KUHN,
W. J. HANN.